(12) United States Patent
Soatti (10) Patent No.: US 10,486,766 B2
(45) Date of Patent: Nov. 26, 2019

(54) REAR OF A MOTORCYCLE WITH CARDAN-SHAFT TRANSMISSION AND RELATED MOTORCYCLE

(71) Applicant: PIAGGIO & C. S.p.A., Pontedera, Pisa (IT)

(72) Inventor: Piero Soatti, Pisa (IT)

(73) Assignee: PIAGGIO & C. S.p.A, Pontedera, Pisa (IT)

( * ) Notice: Subject to any disclaimer, the term of this patent is extended or adjusted under 35 U.S.C. 154(b) by 0 days.

(21) Appl. No.: 15/763,869

(22) PCT Filed: Sep. 27, 2016

(86) PCT No.: PCT/IB2016/055769
§ 371 (c)(1),
(2) Date: Mar. 28, 2018

(87) PCT Pub. No.: WO2017/055996
PCT Pub. Date: Apr. 6, 2017

(65) Prior Publication Data
US 2018/0273135 A1 Sep. 27, 2018

(30) Foreign Application Priority Data
Sep. 29, 2015 (IT) ................. 10201556228

(51) Int. Cl.
*B62K 25/00* (2006.01)
*B62K 25/04* (2006.01)
(Continued)

(52) U.S. Cl.
CPC ............ *B62K 25/005* (2013.01); *B62K 25/04* (2013.01); *B62K 25/283* (2013.01); *B62K 25/286* (2013.01); *B62M 17/00* (2013.01)

(58) Field of Classification Search
CPC ...... B62K 25/005; B62K 25/04; B62K 25/10; B62K 25/28; B62K 25/283; B62K 17/00
See application file for complete search history.

(56) References Cited

U.S. PATENT DOCUMENTS 1,378,309 A * 5/1921 Amiot ..................... B62M 7/00
180/226
4,336,859 A * 6/1982 Leitner .................. B62M 17/00
180/226
(Continued)

FOREIGN PATENT DOCUMENTS

DE 3811889 A1 10/1989
EP 1361149 A1 11/2003
(Continued)

OTHER PUBLICATIONS

International Search Report for PCT/IB2016/055769 dated Jan. 2, 2017.

*Primary Examiner* — Joseph M Rocca
*Assistant Examiner* — Maurice L Williams
(74) *Attorney, Agent, or Firm* — Arent Fox LLP; Michael Fainberg (57) ABSTRACT

The rear of a motorcycle with cardan suspension comprising a rear frame, a fork, hinged to said frame about a hinging axis, the fork rotatably supporting the rotation pin of a rear wheel of the motorcycle around a rotation axis, the fork supporting a cardan-shaft transmission comprising at least one first transmission shaft, suitable to be connected to a power take-off of an associable engine, at least one final shaft provided with a pinion rotatably connected to said rear wheel, wherein between the first transmission shaft and the final shape is interposed a first cardan joint, a floating arm that supports said pinion of the final shaft, the arm being floating around said rotation axis of the rear wheel. The floating arm comprises a cup portion arranged coaxially to
(Continued)

the rotation pin and having at least an inner end that houses and supports said pinion.

12 Claims, 6 Drawing Sheets

(51) Int. Cl.
  *B62K 25/28* (2006.01)
  *B62M 17/00* (2006.01)

(56) References Cited

U.S. PATENT DOCUMENTS

| | | | | |
|---|---|---|---|---|
| 4,434,868 A * | 3/1984 | Brenner | ................. | B62M 17/00 180/226 |
| 4,662,469 A * | 5/1987 | Matsuda | ............... | B62K 25/005 180/219 |
| 5,067,580 A * | 11/1991 | Parker | ................. | B62K 25/005 180/219 |
| 6,932,178 B2 * | 8/2005 | Soatti | ..................... | B62M 17/00 180/226 |
| 2006/0065463 A1 * | 3/2006 | Handa | .................. | B62K 25/283 180/227 |
| 2007/0062752 A1 * | 3/2007 | Sugita | .................... | B62K 11/00 180/309 |
| 2007/0199756 A1 * | 8/2007 | Kofuji | .................. | B62K 25/283 180/226 |
| 2008/0006464 A1 * | 1/2008 | Utsumi | .................. | B62K 25/26 180/226 |
| 2008/0078602 A1 * | 4/2008 | Igarashi | ............... | B62K 25/283 180/227 |
| 2008/0188316 A1 * | 8/2008 | Takamura | ............. | B60K 17/22 464/34 |
| 2008/0236331 A1 * | 10/2008 | Nimura | .................... | B62M 7/02 74/606 R |
| 2009/0229908 A1 * | 9/2009 | Ito | .......................... | B62K 19/30 180/312 |
| 2010/0126306 A1 * | 5/2010 | Ito | ......................... | F16H 57/027 74/607 |

FOREIGN PATENT DOCUMENTS

| | | |
|---|---|---|
| JP | S6218382 A | 1/1987 |
| JP | S6218383 A | 1/1987 |
| WO | 2003093096 A1 | 11/2003 |

* cited by examiner

REAR OF A MOTORCYCLE WITH CARDAN-SHAFT TRANSMISSION AND RELATED MOTORCYCLE

CROSS-REFERENCE TO RELATED APPLICATIONS

This application is the U.S. National Stage Application of International Patent Application No. PCT/IB2016/055769, filed on Sep. 27, 2016, which claims priority to Italian Patent Application No. 102015000056228, filed on Sep. 29, 2015, the contents of each of which is incorporated herein by reference in its entirety.

FIELD OF APPLICATION

This invention relates to a rear of a motorcycle with cardan-shaft transmission and a related motorcycle comprising said rear.

STATE OF THE ART

As is known, motorcycles with cardan-shaft transmission are particularly subject to variation of trim in the transitories, i.e., during acceleration and release.

In fact, the cardan-shaft transmission generally tends to "open" or distend the suspension of the fork during acceleration: this facilitates, respectively, the transmission of torque to the ground and its closing during deceleration. In the transitories, i.e., the transition from supplying torque to closing the gas and vice versa (so-called on-off), the continuous opening/closing of the fork creates an unpleasant sensation for the driver, in addition to compromising, even if limitedly, the trim of the motorcycle.

PRESENTATION OF THE INVENTION

To solve the above problems, to date the known art has adopted a variety of rear suspension solutions for motor vehicles with cardan-shaft transmission.

For example, there are solutions that provide geometries such as to limit as much as possible the variation of trim and load in the cited transitories.

However, these prior art solutions imply some disadvantages because they involve the use of rather complex geometries, with various arms that, if on the one hand they reduce the problem, on the other they increase the weight of the motorcycle.

In addition, these solutions require that the fork not be self-supporting: in other words, the elimination of one or more of such arms causes the fork to collapse. This implies that, in case of failure or breakage of such linkages, the fork is not usable and the vehicle cannot move, so they are generously dimensioned.

Furthermore, the presence of joints and hinges in the rear load-bearing structure necessarily results in a less stiffness compared to the standard one-piece fork.

It is also known, from EP1379428B1, to use a floating arm that has the functioning of separating the reaction torque of the final transmission shaft from the suspension of the fork, by means of a hinged reaction rod, at opposite ends, to the frame and said leverage arm. This solution, which realises a deformable quadrilateral with the fork, has the advantage of avoiding the trim variations typical of rear ends with cardan-shaft transmission. In practice, the torque reaction of the cardan-shaft transmission is absorbed by the reaction rod, preventing the fork as a whole from oscillating around its own hinge axis, thus varying the trim of the motorcycle.

The solution of EP'428 is certainly reliable and functional, but can be further improved.

In fact, this solution has some limitations in terms of versatility, possibility of modifications and customisations as a function of the use of the motorcycle by the user, restoration of functionality in the event of malfunction, shocks, falls and, in general terms, economy of operation.

These limits are overcome by a rear of a motorcycle according to claim 1.

DESCRIPTION OF THE DRAWINGS

Further characteristics and advantages of this invention will be more understandable from the following description of its preferred and non-limiting examples of embodiments, in which.

The elements, or parts of elements, in common between the embodiments described below will be indicated with the same reference numbers.

DETAILED DESCRIPTION

With reference to the above figures, reference number 4 globally indicates an overall schematic view of a rear of a motorcycle 8 with cardan-shaft transmission according to this invention.

For the purposes of this invention, it should be clarified that the term motorcycle must be considered in broad sense, encompassing any motorcycle having at least two wheels, namely one front wheel and at least one rear wheel. Thus, this definition also includes motorcycles having three wheels, of which, for example, two paired steering wheels on the front axle and a drive wheel on the rear axle, but also motorcycles that have a single steering wheel on the front axle and two drive wheels on the rear axle. Finally, this definition of motorcycle also includes so-called quadricycles, having two wheels on the front axle and two wheels on the rear axle.

The rear 4 comprises a rear frame 12 and a fork 16, hinged to said frame 12 around one or more pins 18 defining a hinging axis X-X.

It should be clarified that the connection between the fork 16 and the rear frame 12 can be direct, i.e., through direct hinging, or it can also take place by means of the interposition of levers and/or small intermediate frames.

The frame 12 can have any shape and size and can be for example of the lattice or box type, die-cast and so on.

The frame 12 can be in one piece or in several parts; typically the portion of frame 12 that interfaces with the fork 16 supports the saddle of the driver and/or passenger.

The fork 16 rotatably supports a rotation pin 20 of at least one rear wheel 24 of the motorcycle 8 around a rotation axis Y-Y.

The fork 16 is preferably a hollow, box-like structure.

In particular, said hollow, box-like structure can be divided, along a prevailing extension axis S-S of the fork 16, into two hollow parts. A first hollow part 13 connects the fork 16 to the rear frame 12 in correspondence of said pins 18. A second hollow part 14 connects the fork 16 to the rotation pin 20 of the rear wheel 24.

Figure 1:
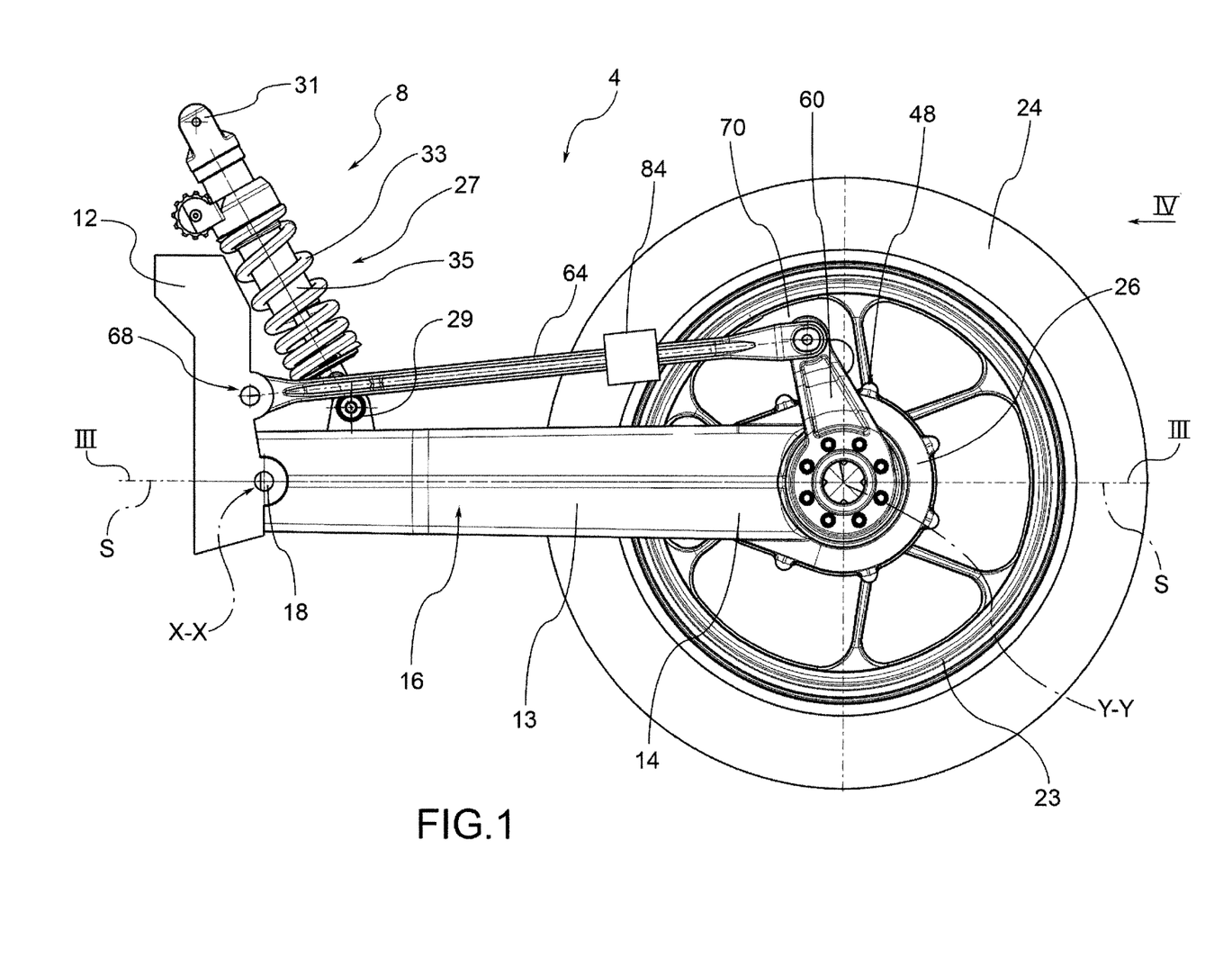
FIG. 1 is a side view of a rear of a motorcycle according to this invention.
Figure 2:
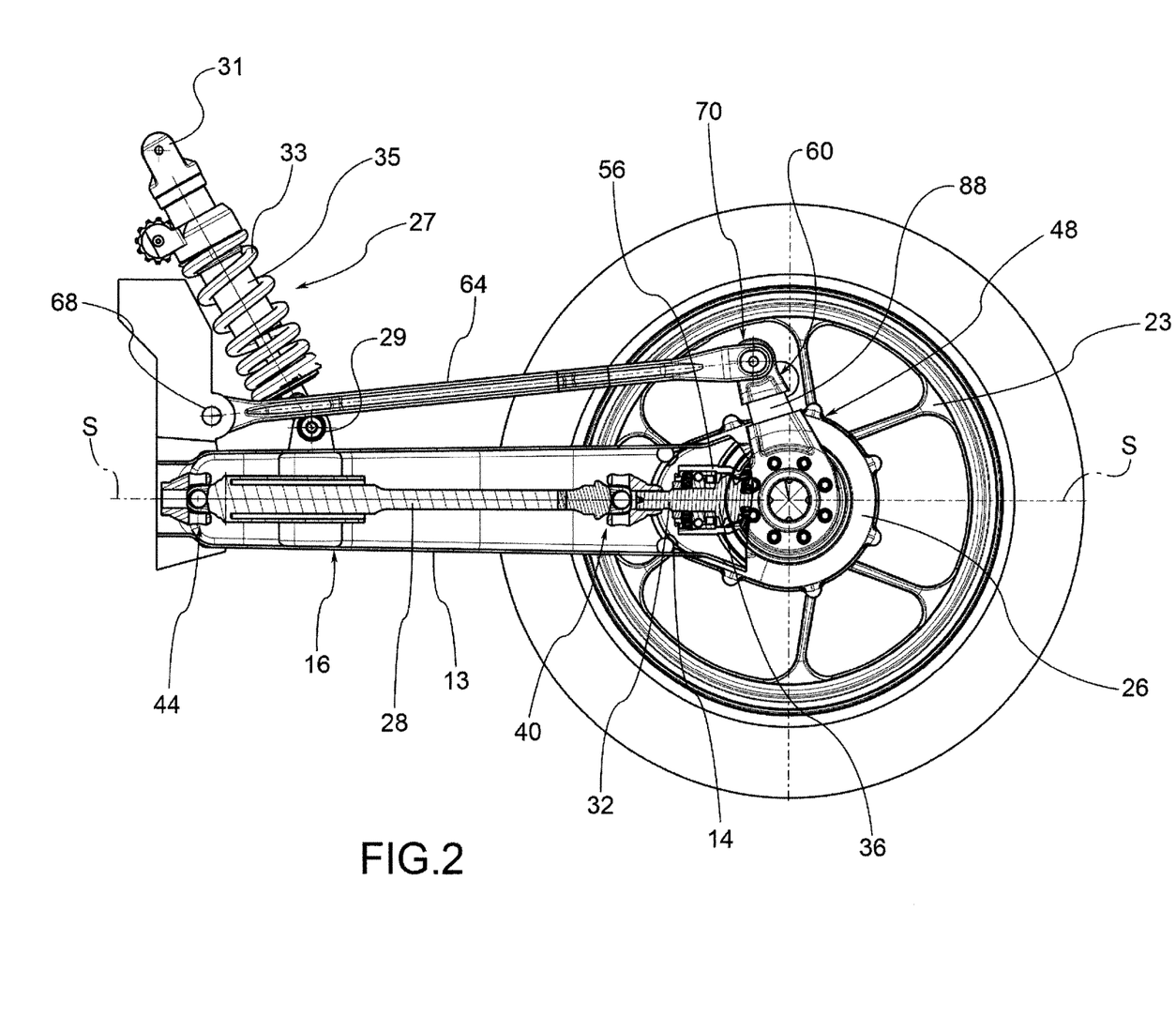
FIG. 2 is a side view, partially in section, of the rear of the motorcycle of FIG. 1.

Said hollow parts 13,14 are preferably in one piece with each other (FIGS. 1, 2 and 3) according to said prevailing extension axis S-S.

In other words, the fork 16 comprises a hollow, box-like structure which extends monolithically along a main extension axis S-S from a first hollow part 13, which connects the fork 16 to the rear frame 12, to a second hollow part 14 which connects the fork 16 to the rotation pin 20 of the rear wheel 24.

In this way it is possible to achieve an extremely rigid box-like structure, with respect to bending and torsional deformations to which the fork 16 is normally subjected; this increased stiffness improves the driving precision of the motorcycle.

According to an embodiment, said hollow parts 13,14 are mechanically connected to each other without the interposition of any gasket. In fact, advantageously, the hollow, box-like structure of the fork is not in an oil bath neither in correspondence of the first hollow part 13, nor in correspondence of the second hollow part 14.

According to an embodiment, the fork 16 comprises a front cover panel 26, placed at least partially coaxially to the rotation pin 20 on the opposite side to a centreline plane M-M of the associable rear wheel 24.

In addition, the fork 16 also includes a rear housing 25, directly facing a wheel rim 23 of the rear wheel 24.

It should be noted that the rear housing 25 is mechanically coupled to the front cover panel 26 in correspondence of a coupling surface 30 arranged in proximity of said rear wheel rim 23.

The coupling surface 30 is therefore arranged in such a way as to facilitate the assembly and disassembly of the fork.

Said coupling surface 30 is also without gasket since the front cover panel 26 and rear housing 25 enclose a volume without lubricating oil or grease bath. Said volume houses the cup portion 52 and the inner end 56.

The fork 16 is operatively connected to a suspension having a first end 29 hinged to the fork 16 and a second end 31 hinged to said rear frame 12.

The suspension 27 can be of any type; for example, the suspension 27 comprises a spring 33 and a shock absorber 35; said spring 33 and said shock absorber 33 are preferably coaxial with each other.

The fork 16 supports a cardan-shaft transmission comprising at least one first transmission shaft 28, suitable to be connected to a power take-off of an associable engine (not shown).

The engine can be of any type, for example, endothermic and/or electric; the power take-off can comprise a pinion or a gear in general.

The cardan-shaft transmission further comprises at least one final shaft 32 fitted with a pinion 36 rotatably connected to said rear wheel 24.

Typically, the pinion meshes with a toothed wheel, for example a conical pair, integral in rotation with the rear wheel 24.

Between the first transmission shaft 28 and the final shaft 32 is interposed a first cardan joint 40.

The first transmission shaft 28 can, in turn, be operatively connected to the power take-off through the interposition of a second cardan joint 44.

The fork 16 is a hollow, box-like structure that, internally, at least partially houses said cardan-shaft transmission.

The rear 4 also includes a floating arm 48 that supports said pinion 36 of the final shaft 32.

The arm 48 floats around rotation axis Y-Y of the rear wheel 24.

For example the rotation movement of the floating arm 48 around the rotation axis Y-Y is guided by suitable bearings 50.

According to an embodiment the floating arm 48 comprises a cup portion 52 placed coaxially to the rotation pin 20 and having at least one inner end 56 housing and supporting said pinion 36, and an outer appendix 60 positioned cantilevered with respect to said cup portion 52.

The cup portion 52 is integral with the inner end 56 and with the outer appendix 60.

The cup portion 52 is rotatably released from the rotation pin 20 of the rear wheel 24.

Advantageously, the cup portion 52 is a closed portion that contains oil or lubricating grease and is provided with special gaskets to retain said lubricant inside. The amount of lubricant contained in the cup portion 52 and the inner end 56 is extremely small compared to that contained in the previous solutions, such as for example EP1379428B1.

The outer appendix 60 is mechanically connected to the cup portion 52 by threaded connection means 61 and is fluidically separated from the cup portion 52.

Therefore, the outer appendix 60 is not in an oil bath inside the cup portion 52, but is arranged externally to this.

Figure 3:
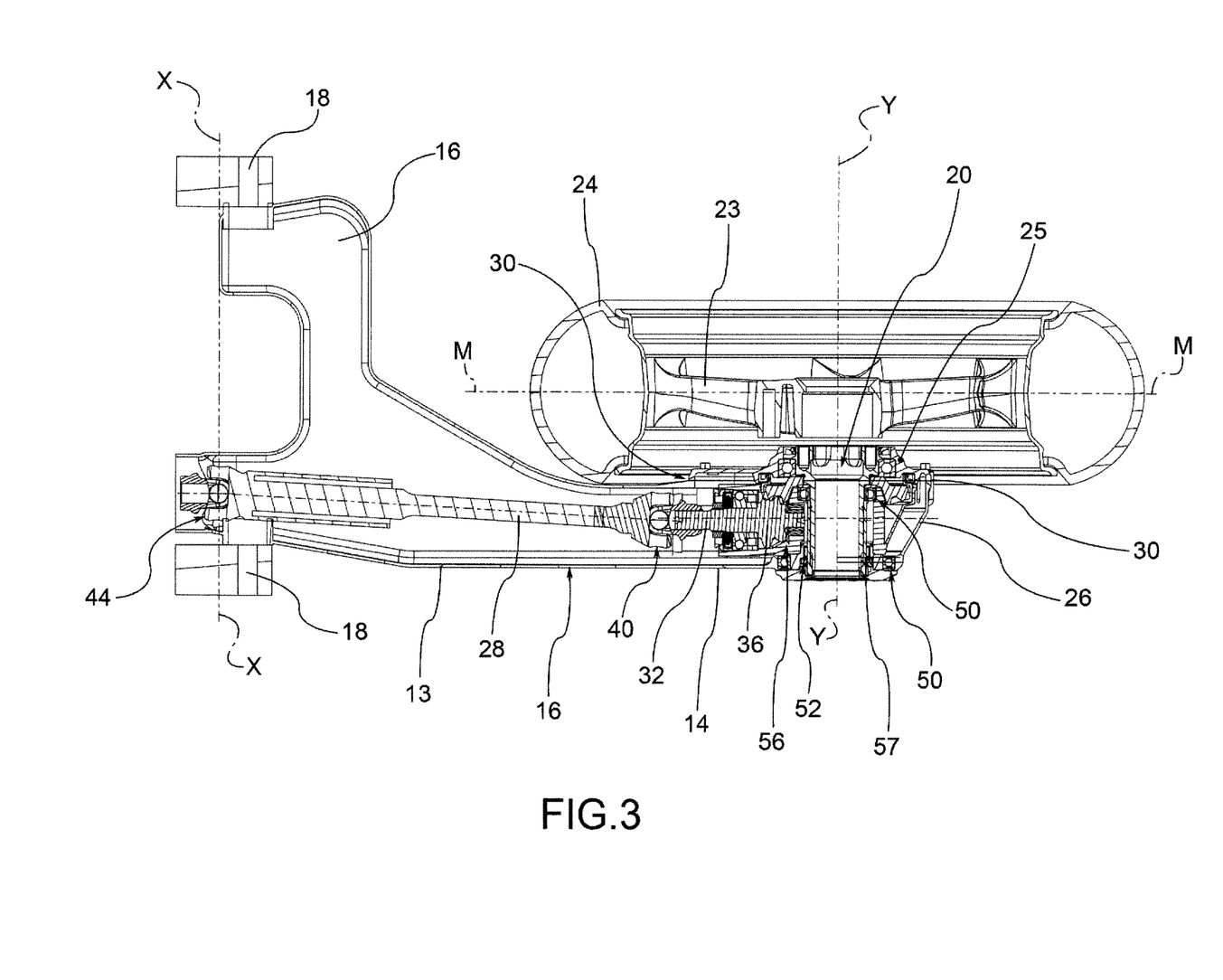
FIG. 3 is a sectional view of the rear of the motorcycle of FIG. 1, along the section plane III-III of FIG. 1.
Figure 4:
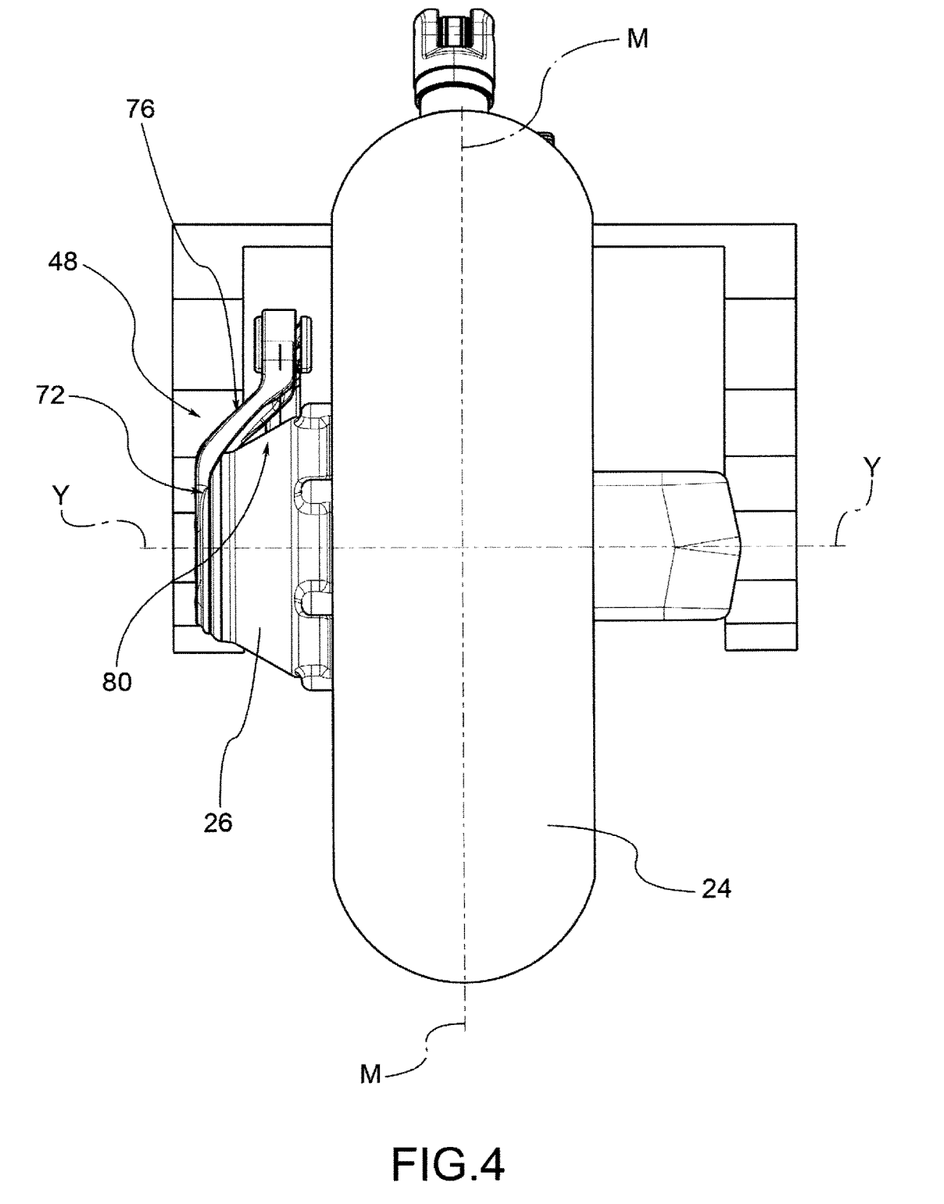
FIG. 4 is a side view of the rear of the motorcycle of FIG. 1, from the side of the arrow IV of FIG. 1.
Figure 5:
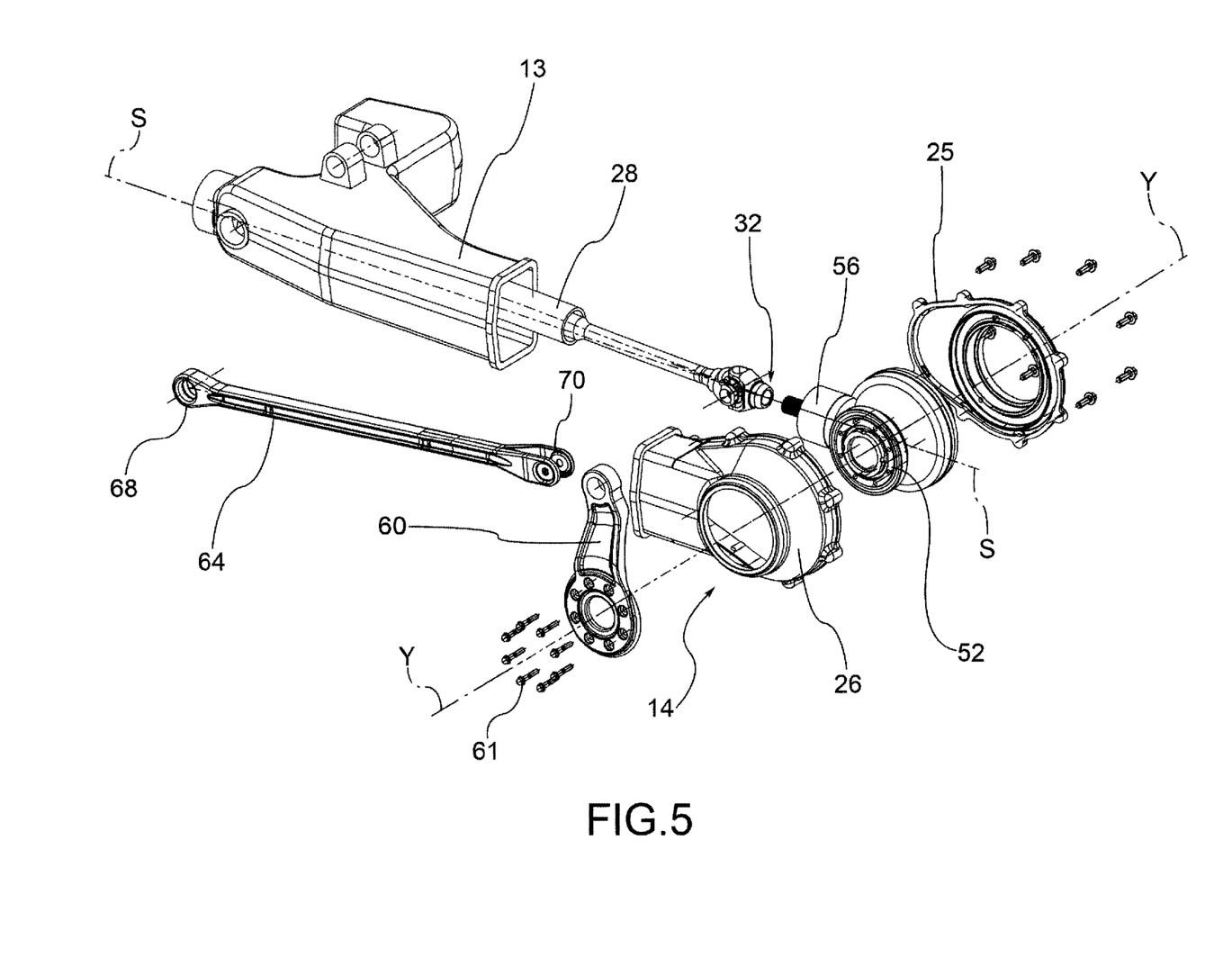
FIG. 5 is a perspective view, in separate parts, of some components of the rear of the motorcycle of FIG. 1.
Figure 6:
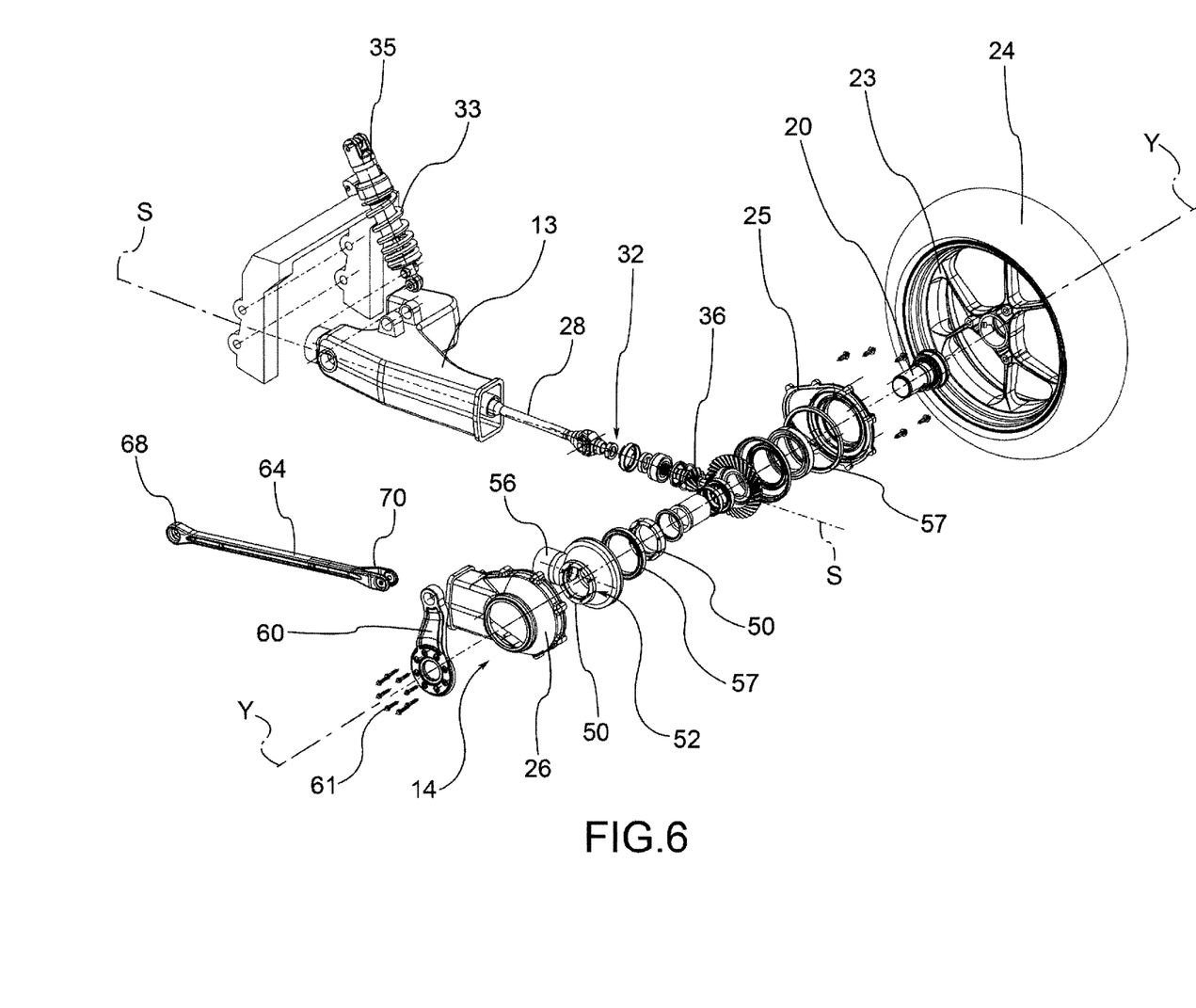
FIG. 6 is a perspective view, in separate parts, of the rear of the motorcycle of FIG. 1.

Advantageously, it is possible to realise the hollow parts 13,14 of the fork 16 together in one piece (FIG. 3).

In this way, it is possible to achieve an extremely stiff box-like structure that improves driving precision.

It should be noted that the coupling surface 30 in this invention is not arranged along a median plane of the fork, perpendicular to the rotation axis Y-Y of the wheel and passing along said prevailing extension axis S-S. This positioning in on the median plane is present for example in EP1379428, wherein the coupling surface of the covers passes through the radial opening 19 through which the arm 26 is inserted. This median positioning of the arm 26 imposes the realisation of two covers having a reduced torsional and bending stiffness.

Instead, in this invention it is possible to create a substantially monolithic fork structure having a coupling surface 30 of the covers 25,26 that is not median with respect to the fork, but shifted toward the centreline plane M-M of the rear wheel 24. This structure with increased stiffness is made possible by the fact that the outer appendix 60 does not pass through the cover of the fork radially, but the outer appendix 60 protrudes with respect to the cup portion 52 in the axial direction, i.e., parallel to said rotation axis Y-Y, so as to project axially from said front cover panel 26.

In particular, in case of maintenance, it is not necessary, as in the prior art solutions, to disassemble the entire end portion of the hollow fork filled with oil. Such disassembly would, first of all, tend to deform the structure of the hollow fork. In the case of this invention, it will instead be sufficient to detach the rear housing 25 and/or the front cover panel 26, after disassembling the outer appendix 60, and then slide out the floating arm 48 comprising the cup portion 52 and the inner end 56.

Such disassembly is particularly easy since, as seen, said covers 25,26 do not contain an oil bath.

It should be noted that, in the prior art solutions, such as for example EP1379428B1, in order to perform internal maintenance to the transmission is necessary to completely disassemble the covers of the fork, which must necessarily be made of several parts: In fact, the appendix connected to the reaction rod is internal and in an oil bath, radially passes through the front cover panel and cannot be removed without first dividing in two and disassembling the transmission box.

In this solution, instead, the appendix 60 is precisely external, is not in an oil bath and can be easily removed from the outside. For example, it is sufficient to remove the rear housing 25 and slide out the floating arm 48, comprising the cup portion 52 and the inner end 56. The structure of the fork 16 of this invention may be monolithic so as to provide higher stiffness and greater driving precision.

The outer appendix 60 is mechanically connected to the rear frame 12 by means of the interposition of a reaction rod 64 hinged, at opposite axial ends 68,70 to the rear frame 12 and to the outer appendix 60 respectively.

The reaction rod 64 is a rigid element that receives the reaction torque of the pinion 36 by means of the floating arm 48 and discharges it on the rear frame 12.

In other words the reaction rod 64 is a stiff connecting rod, doubly hinged at the axial ends 68,70, respectively to the rear frame 12 and floating arm 48.

In this way, the reaction torque of the final shaft 32 of the cardan-shaft transmission is separated from the suspension of the rear wheel 24, through said floating arm 48.

Advantageously, the outer appendix 60 comprises a first section 72 which projects in relation to the cup portion 52 in axial direction, i.e., parallel to said rotation axis Y-Y in order to come out axially from said front cover panel 26, and a second section 76 which comprises a portion axially recessed towards said centreline plane M-M of the associable rear wheel 24.

According to an embodiment, the second section 76 is substantially counter-shaped with respect to an outer side wall 80 of the front cover panel 26.

In particular, the second section 76 is counter-shaped with respect to an outer side wall 80 of the front cover panel 26, so as not to interfere with said panel in its floating movement around the rotation axis Y-Y.

For example, the front cover panel 26 is frusto-conical around said rotation axis Y-Y and the second section 76 is a substantially straight and parallel to a generatrix straight line of said frusto-conical panel.

The outer appendix 60 is shaped so that the reaction rod is arranged parallel to said centreline plane M-M of the associable rear wheel 24.

According to an embodiment, the reaction rod 64 comprises first adjustment means 84 of the length of said reaction rod 64, i.e., of the distance between the axial ends 68,70 of said reaction rod 64.

According to an embodiment, the outer appendix 88 comprises second adjustment means 88 of the length of the outer appendix 60, i.e., the distance between the rotation axis Y-Y and a hinging point of the corresponding axial end 70 of the reaction rod 64.

For example, said first and second adjustment means 84,88 of the length of the reaction rod 64 and/or of the outer appendix 60 comprise screw adjustment means.

As seen, the centre of instantaneous rotation of the fork is given by the point of intersection of the projections on the centreline plane M-M of the rear wheel of a first and of a second straight line. In particular, the first straight line passes through the projection of the rotation axis Y-Y on the centreline plane M-M and through the hinging axis X-X of the fork 16 on the centreline plane M-M. The second straight line connects the projections on the centreline plane M-M of the axial ends 68,70 of the reaction rod 64.

The reaction rod 64 is oriented such a way that the first and the second straight line are parallel and intersect each other in said centre of instantaneous rotation. Furthermore, the reaction rod is oriented so that the centre of instantaneous rotation is arranged on the side opposite the rear wheel 24, obvious from the side of a front of the motorcycle.

The reaction rod may be arranged either above the fork 16, i.e., on the side opposite the ground with respect to the fork 16, or below the fork 16, i.e., between the ground and the fork 16.

As can be appreciated from the description, this invention allows overcoming the drawbacks presented in the prior art.

In particular, the rear of the motorcycle has a pleasing appearance since it allows eliminating any outer bellows required by the known solutions.

Furthermore, this advantage is also technical and reliable since a bellows is a "weak" element that leaks oil when cut.

Furthermore, bellows introduce the further limitation of not being positionable below because there would be a high risk of oil leaks; therefore, bellows do not allow the rotation of the outer appendix and the relative reaction rod so as to position them below the rotation pin of the wheel. The solution of this invention, while always being depicted above the rotation pin of the wheel, places no limitation in respect of that placement. Therefore, the embodiment is allowed wherein the outer appendix and the reaction rod are rotated 180 degrees with respect to the accompanying figures, i.e., an embodiment wherein the outer appendix and the reaction rod are specular with respect to an axis joining the pin of the fork with the rotation pin of the wheel.

This positioning of the reaction rod and outer appendix below can for example be useful for lowering the centre of gravity of the rear.

In addition, it also improves the lubrication of the cardan-shaft transmission: in fact, the floating arm is external with respect to the cover that encloses the cardan-shaft transmission and therefore does not influence the flow of oil inside the cover in any way. So, in summary, the flow of lubricating oil is not changed in any way and the risks of leaks and oozing are avoided since the related gasket or seal between the floating arm and the cover is eliminated.

Moreover, the floating arm does not have a fixed angular position as in the known solutions, such as for example EP'428; in this solution, the angular position of the floating arm is given by the angular extension of the slot made on the cover to allow the arm itself to come out of the cover and support the reaction rod.

In this invention, since the floating arm is external with respect to the cover, there is no longer any geometric constraint on the angular position of the floating arm with respect to the cover. Therefore, the user has the possibility of modifying at will the angular fixing position of the floating arm with respect to the cover to vary the dynamics of the rear and thus of the vehicle. In fact, the centre of instantaneous rotation of the rear is given by the point of intersection between the axis of prevailing extension of the fork and the direction identified by the reaction rod. So, if you change the angular orientation of the floating arm you also change the position of the centre of instantaneous rotation of the fork and thus the dynamic behaviour of the motorcycle.

This variation does not necessarily require an intervention in the garage but can also be made by a user. It is also possible to replace the reaction rod, for example modifying its length as a function of the rotation of the reaction rod.

The reaction rod may also be provided with first adjustment means of the length so as to adapt the length of the rod to the position of the floating arm position without having to replace the rod itself with one of different length.

For example, the choice of the length of the rod and the rest position of the floating arm can be varied depending on the type of motorcycle or the specific use (for example in road or off-road use), for which it may be advantageous to modify, even significantly, the centre of instantaneous rotation of the fork. In other words, the user can change the trim of the motorcycle at will, depending on the load (presence or absence of a passenger and/or luggage), the route, the terrain and so on.

Rest position means the position in static conditions and in the absence of torque transmitted to the final shaft of the cardan-shaft transmission.

It is also possible, as seen, to provide for the insertion of second adjustment means of the length of the outer appendix, always from the point of view of being able to change the trim of the motorcycle at will, depending on the load (presence or absence of a passenger and/or luggage), the route, the terrain and so on.

It is also possible to vary the calibration of the suspension of the rear, for example the rest position of the floating arm, as a function of the variation of the calibration of the shock absorber and thus the pre-load of the spring, but also the braking in extension and/or compression of the shock absorber, at will.

Moreover, thanks to this invention, in case of impact or fall, it is possible to easily and quickly replace the reaction rod and/or the floating arm, without having to replace the entire transmission assembly.

Furthermore, as seen, the rear solution according to this invention allows separating the reaction torque of the final transmission shaft (of cardan type) from the suspension, precisely through the floating arm: in this way, the variation of trim of the motorcycle during acceleration and release is reduced to the minimum.

Finally, thanks to the geometry of the rear according to this invention, the fork, even in case of accidental breakage of the reaction rod and/or the floating arm, does not collapse but remains supported by the suspension. So, the motorcycle would still be drivable.

Furthermore, as seen, thanks to the fact that the appendix of the floating arm is external, and is not in an oil bath, it can be removed from the outside with extreme ease.

In addition, it is possible to realise a monolithic structure of the fork so as to provide a higher flexural and torsional stiffness than the known solutions and a greater driving precision.

A person skilled in the art, in order to satisfy contingent and specific needs, may make numerous modifications and variations to the rears described above, all however contained within the scope of the invention as defined by the following claims.

The invention claimed is:

1. A rear of a motorcycle with a cardan-shaft transmission comprising:
    a rear frame;
    a fork hinged to the frame around a hinge axis, the fork rotatably supporting a rotation pin of a rear wheel of the motorcycle around a rotation axis,
    the fork supporting a cardan-shaft transmission comprising at least a first transmission shaft suitable to be connected to a power take-off of an associable engine, at least one final shaft fitted with a pinion rotatably connected to said rear wheel, wherein between the first transmission shaft and the final shaft a first cardan joint is interposed; and
    a floating arm which supports said pinion of the final shaft, the arm floating around said rotation axis of the rear wheel,
    wherein the floating arm comprises a cup portion placed coaxially to the rotation pin and having at least one inner end housing and supporting said pinion, and an outer appendix positioned cantilevered with respect to said cup portion,
    wherein the cup portion is rotatably released from the rotation pin of the rear wheel,
    wherein the outer appendix is mechanically connected to the rear frame by an interposition of a reaction rod hinged at opposite axial ends, to the rear frame and to the outer appendix, respectively,
    wherein the fork comprises a front cover panel, placed at least partially coaxially to the rotation pin on the opposite side to a centreline plane of the associable rear wheel, and
    wherein the outer appendix comprises a first section which projects in relation to the cup portion in an axial direction, parallel to said rotation axis in order to come out axially from said cover panel, and a second section which comprises a portion axially recessed towards said centreline plane of the associable rear wheel.

2. The rear of the motorcycle according to claim 1, wherein the second section is substantially counter-shaped to an outer side wall of the front cover panel so as not to interfere with said panel when the panel floats around the rotation axis.

3. The rear of the motorcycle according to claim 1, wherein the front cover panel is frusto-conical around said rotation axis and the second section is substantially straight and parallel to a generatrix straight line of said frusto-conical panel.

4. The rear of the motorcycle according to claim 1, wherein the outer appendix is shaped so that the reaction rod places itself parallel to said centreline plane of the associable rear wheel.

5. The rear of the motorcycle according to claim 1, wherein the fork comprises a rear housing facing a wheel rim of the rear wheel, the rear housing being mechanically coupled to the front cover panel at a coupling surface placed near the centreline plane of the associable rear wheel.

6. The rear of the motorcycle according to claim 1, wherein the fork comprises a rear housing mechanically coupled to the front cover panel, wherein the front cover panel and the rear housing enclose an unwetted space devoid of lubricating oil or grease, said space housing therein the cup portion and the inner end.

7. The rear of the motorcycle according to claim 1, wherein the fork comprises a hollow three-dimensional structure which extends monolithically along a main extension axis from a first hollow part, which connects the fork to the rear frame to a second hollow part which connects the fork to the rotation pin of the rear wheel.

8. The rear of the motorcycle according to claim 1, wherein the reaction rod comprises a first adjuster of the length of the reaction rod so as to adjust the distance between the axial ends of said reaction rod.

9. The rear of the motorcycle according to claim 1, wherein the outer appendix comprises a second adjuster of the length of the distance between the rotation axis and a hinging point of the corresponding axial end of the reaction rod.

10. The rear of the motorcycle according to claim 9, wherein said first and/or second adjusters comprise screw adjusters.

11. The rear of the motorcycle according to claim 1, wherein the fork is operatively connected to a suspension having a first end hinged to the fork and a second end hinged to said rear frame.

12. A motorcycle comprising the rear according to claim 1.

* * * * *